(12) United States Patent
Baudu et al.

(10) Patent No.: US 6,450,726 B1
(45) Date of Patent: *Sep. 17, 2002

(54) DEVICE TO ADJUST THE SWIVELLING OF TWO MECHANICAL PARTS AND METHOD FOR THE MAKING OF THIS DEVICE

(75) Inventors: Jean-Pierre Baudu, Fontanes; Dominique Chervin, St Priest en Jarez; Boris Vigaud, La Buisse, all of (FR)

(73) Assignee: Thomson-CSF, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/468,876

(22) Filed: Dec. 22, 1999

(30) Foreign Application Priority Data

Dec. 23, 1998 (FR) .............................. 98 16349

(51) Int. Cl.⁷ .................................. F16B 7/10
(52) U.S. Cl. ........................................ 403/83
(58) Field of Search ................ 52/126.7, 126.4, 52/167.7, 508, 785.1; 248/349.1, 634, 396; 403/83, 84, 91, 99, 103, 104, 220, 225, 227, 203

(56) References Cited

U.S. PATENT DOCUMENTS

| 3,814,507 A | * | 6/1974 | Osborn et al. |
| 3,886,474 A | * | 5/1975 | Hensolt et al. |
| 3,953,113 A | * | 4/1976 | Shull |
| 4,442,524 A | * | 4/1984 | Reeder et al. |
| 4,807,839 A | * | 2/1989 | Nettleton et al. |
| 5,400,184 A | * | 3/1995 | Kuklo |

FOREIGN PATENT DOCUMENTS

| DE | 1 639 199 | | 9/1970 |
| DE | 1639199 | * | 9/1970 |
| EP | 0 283 450 | | 9/1988 |
| EP | 283450 A2 | * | 9/1988 |

* cited by examiner

Primary Examiner—Lynne H. Browne
Assistant Examiner—Tomlyne Malcolm
(74) Attorney, Agent, or Firm—Oblon, Spivak, McClelland, Maier & Neustadt, P.C.

(57) ABSTRACT

A swivelling device to adjust the swivelling of two mechanical parts includes a flexible coupling placed between the two mechanical parts which have opposed interior surfaces facing each other. The opposed external surfaces of the swivelling device are contiguous with respective opposed interior surfaces of the two mechanical part and providing a flexible cushion between the two parts. The method for positioning the flexible coupling includes the operations of drilling a hole into one of the mechanical parts and then injecting a flexible material through the hole to form a flexible coupling between the two mechanical parts.

13 Claims, 4 Drawing Sheets

DEVICE TO ADJUST THE SWIVELLING OF TWO MECHANICAL PARTS AND METHOD FOR THE MAKING OF THIS DEVICE

BACKGROUND OF THE INVENTION

The invention relates to a device to adjust the swivelling of two mechanical parts and a method for making this device. The swivelling consists of an angular adjustment of a mechanical part with respect to another. This adjustment can be done in several directions. The invention can be used for example to adjust the swivelling of a mirror with respect to a mechanical support, where the adjustment has to be done with a precision of less than one angular minute.

There are known ways to adjust swivelling by means of mechanical devices that use a large number of mechanical parts such as cams and springs. These devices require a delicate adjustment procedure. The large number of mechanical parts furthermore tends to increase the mass and cost of the device.

SUMMARY OF THE INVENTION

It is an object of the invention to simplify the existing devices. To achieve this aim, an object of the invention is a device to adjust the swivelling of two mechanical parts, the device comprising a flexible coupling comprising bonder placed between the two parts and acting as a ball joint between the two parts and means to adjust the distance between the two parts, these means being located at a given distance from the joint.

Advantageously, the center of rotation of the ball joint is located inside the flexible coupling, thus giving a wide amplitude of swivel adjustment.

An object of the invention is also a method for the positioning of a flexible coupling between the two mechanical parts, wherein a hole is drilled into one of the mechanical parts and wherein the material of the flexible coupling is injected through the hole.

BRIEF DESCRIPTION OF THE DRAWINGS

The invention will be understood more clearly and other advantages shall appear from the reading of the following description and the appended drawing of which.

MORE DETAILED DESCRIPTION

Figure 1:
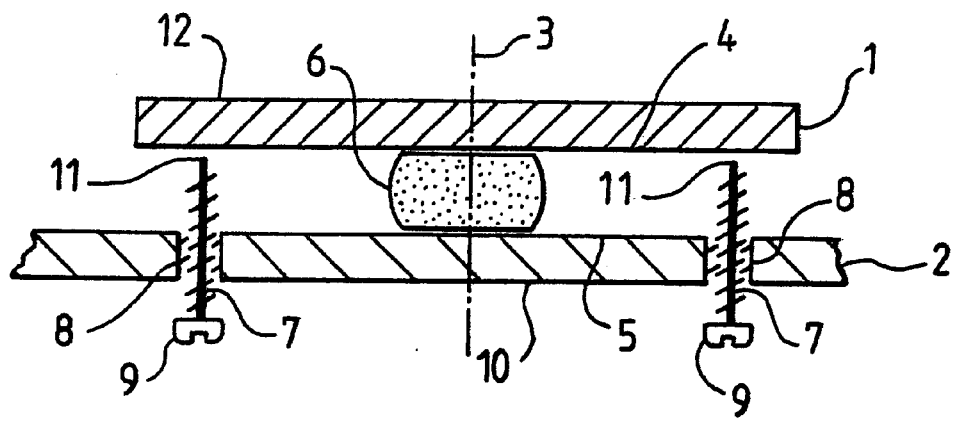
FIG. 1 shows a first embodiment according to the invention in which the flexible coupling is subjected essentially to tensile forces.

FIG. 1 shows two mechanical parts 1 and 2. These parts are substantially plane. The part 1 is for example a part with a shape generated by revolution about an axis 3. Between the lower face 4 of the part 1 and the upper face 5 of the part 2, a flexible coupling 6 is interposed. This flexible coupling is for example cylindrical with an axis 3. The flexible coupling is held in contact, for example by bonding, with the lower face 4 and the upper face 5. Means for adjusting the distance between the two parts 1 and 2 are constituted for example by two screws 7. The part 2 has two threaded holes 8. The axis of each of the threaded holes 8 is substantially parallel to the axis 3. The two threaded holes 8 are located on either side of the coupling 6. A screw 7 is screwed into each of these threaded holes 8. The screw 7 may be headless. Each screw 7, at one of its ends, has a rotational driving means 9. The means 9 may consist of a recess or indent that receives a screwdriver. The means 9 is located on the lower face 10 side of the part 2. The other end 11 of each screw 7 is in contact with the lower face 4 of the part 1. The swivel adjustment of the device is obtained by tightening one of the screws and loosening the other. Thus, the end 11 of the one of the screws 7 tends to approach the part 2 and the end 11 of the other screw 7 tends to move away from it. The flexible coupling acts as a ball joint around which the part 2 can shift angularly. This enables the adjusting of the swivelling of the part 1 with respect to the part 2.

Figure 2:
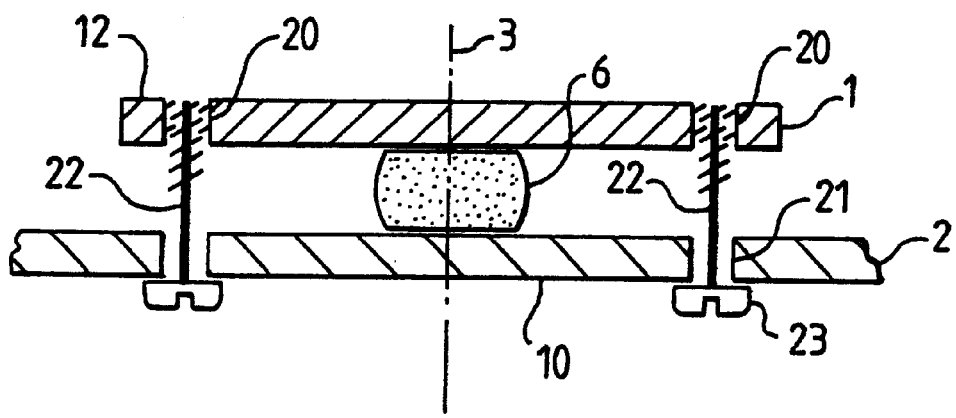
FIG. 2 shows a second embodiment of a device according to the invention in which the flexible coupling is subjected essentially to compressive forces.

FIG. 2 shows the parts 1 and 2 as well as the joint 6 positioned as in FIG. 1. On either side of the joint 6, the part 1 has two threaded holes 20 with an axis substantially parallel to the axis 3. The part 2 has two smooth-bored holes 21. The two smooth-bored holes 21 are substantially in the extension of the threaded holes 20. The threaded holes 21 enable the free passage of the thread of two screws 22. Each screw 22 has a head 23. The thread of each screw 22 gets screwed into one of the threaded holes 20. The head 23 presses against the lower face 10 of the part 2. In order to adjust the swivelling of the part 1 with respect to the part 2, one of the screws 22 is tightened and the other is loosened. Here too, the coupling 6 is used as a ball joint, enabling the part 1 to shift angularly with respect to the part 2.

When the invention is implemented to adjust the swivelling of a mirror with respect to a mechanical support, the mirror can be fixed to the upper face 12 of the part 1, the part 2 serving as a mechanical support.

When the device is liable to undergo impacts or vibrations, it is advantageous to prestress the flexible coupling 6. This prestress is obtained by tightening all the screws 7 shown in FIG. 1 or all the screws 22 shown in FIG. 2. More specifically, the screws 7 tend to move the part 1 away from the part 2. Thus, the flexible coupling 6 shown in FIG. 1 is constantly subjected to tensile stresses, preventing the ends 11 of the screws 7 from losing contact with the lower face 4 of the part 1, even under the effect of a shock or a vibration. In the same way, in FIG. 2, the screws 22 tend to make the part 1 approach the part 2. This prestress will make it possible to hold the flexible coupling 6 under compressive force, making it possible to avoid a loss of contact between the screw heads 23 and the lower face 10 of the part 2 under the effect of an impact or a vibration.

The embodiment shown in FIG. 1 will preferably be used when full control is achieved over the adhesion of the joint 6 to the two parts 1 and 2. The embodiment described by means of FIG. 2 could be implemented even if the adhesion of the joint 6 to the parts 1 and 2 is not properly controlled.

Figure 3:
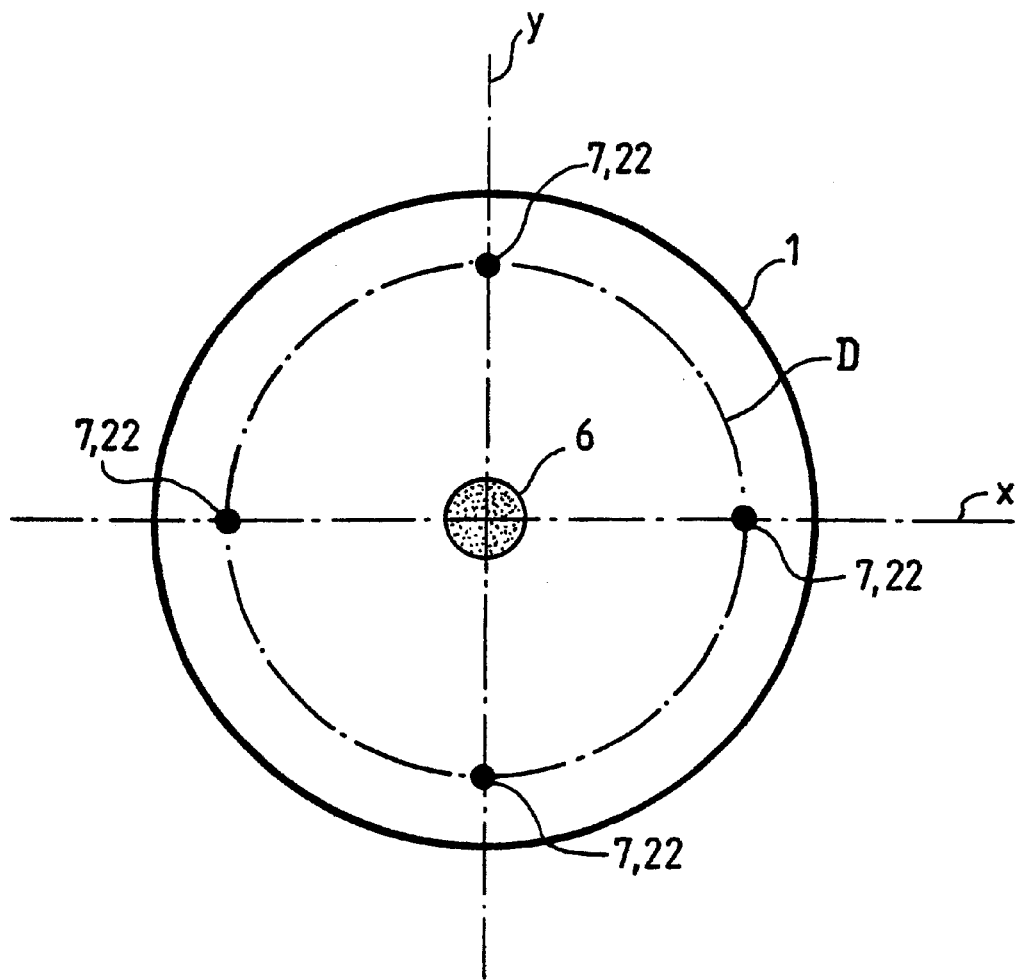
FIG. 3 shows an exemplary arrangement of the means for adjusting the distance between the two parts with respect to the flexible coupling in order to adjust the swivelling in several directions.

The two embodiments shown in FIGS. 1 and 2 can be used to adjust the swivelling of the part 1 with respect to the part 2 in one direction. FIG. 3 shows a top view of an exemplary arrangement of the screws 7 or 22 with respect to the flexible coupling 6. This arrangement adjusts the swivelling in two directions. The part 1 is shown in a top view by a circle drawn in a bold line. At the center of the circle and concentrically with it, there is the flexible coupling 6, also drawn in a bold line but with a far smaller diameter than that of the part 1. The position of the four screws 7 or 22 has also been shown. The axis of each screw is substantially perpendicular to the plane of FIG. 3. The position of two of these screws is shown on an axis X of the part 1. The position of the other two screws 7 or 22 is shown on an axis Y of the part 1. The two axes X and Y are substantially perpendicular to each other. The four screws 7 or 22 are located substantially on a circle with a diameter D. The diameter D is greater than the diameter of the flexible coupling 6 and smaller than the diameter of the part 1. The position of the two screws 7 or 22 located on the axis X enables the swivelling of the part 1 to be adjusted with respect to the part 2 in a plane that is perpendicular to the plane of FIG. 3 and contains the axis X. Similarly, the two screws 7 and 22 located on the axis Y enable the swivelling of the part 1 to be adjusted in a plane that is perpendicular to FIG. 3 and contains the axis Y.

The precision of the swivel adjustment is a function of two parameters: the diameter D and the pitch of the screws 7 and 22. This arrangement makes it possible to obtain a precision of about twenty angular seconds.

Figure 4:
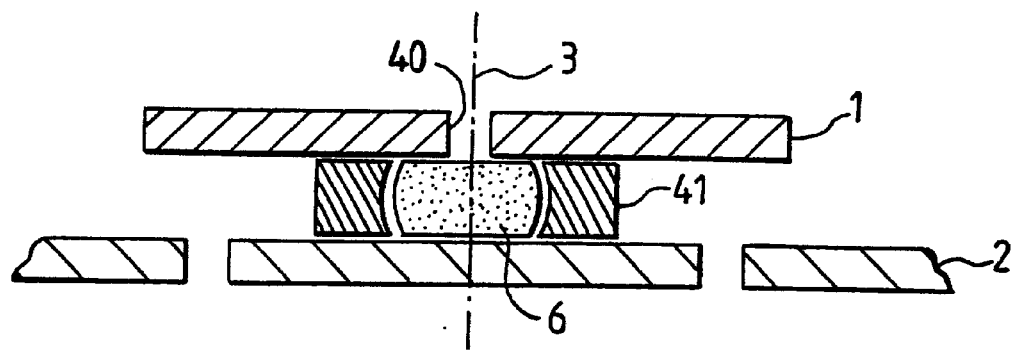
FIG. 4 shows a sectional view of a mold enabling the making of the flexible coupling.
Figure 5:
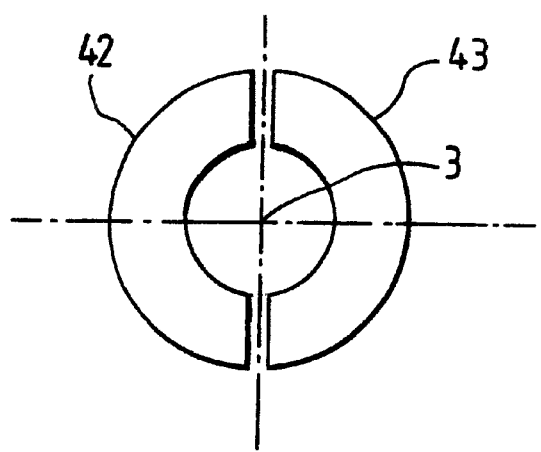
FIG. 5 shows the mold shown in FIG. 4 in a top view.

FIG. 4 shows the part 1, the part 2 and the flexible coupling 6. At the center of the part 1, there is a hole 40 substantially with an axis 3. The hole 40 enables the injection of the material of the flexible coupling between the parts 1 and 2. Advantageously, in order to fully control the length of the joint 6 along the axis 3, it is possible, between the part 1 and the part 2, to interpose thickness shims in order to maintain the distance of the parts 1 and 2 during the injection of the flexible coupling 6. Advantageously, the shims serve as a mold 41. This mold 41 makes it possible to control the shape and size of the flexible coupling 6. The mold 41 is shown in a top view in FIG. 5. In order to enable the flexible coupling 6 to be stripped from the mold, the mold 1 must be designed so as to have at least two parts 42 and 43 forming two angular sectors of 180° around the axis 3. The parts 42 and 43 are positioned before the injection of the material of the flexible coupling 6 and are withdrawn after the flexible coupling has stabilized. Advantageously, the flexible coupling is constituted by bonder material. A bonder material is chosen with a Young's modulus ranging, for example, from 1 to 10 MPa.

Figure 6:
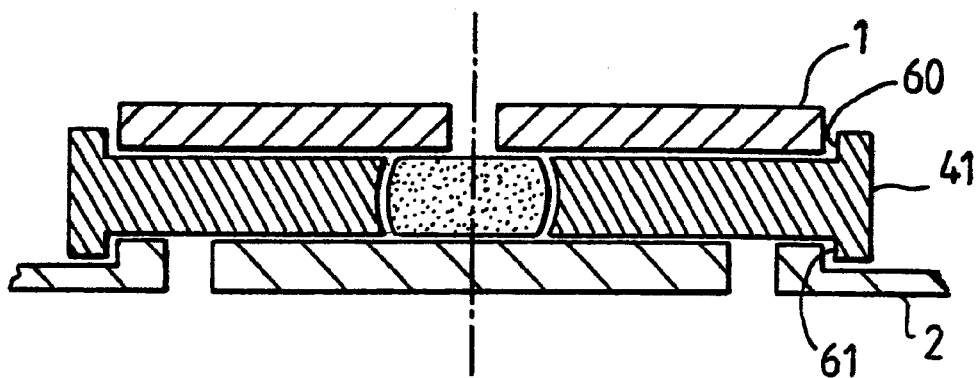
FIG. 6 shows a mold positioned with respect to two mechanical parts.

FIG. 6 shows an exemplary embodiment of the means for positioning the part 1 with respect to the part 2 by means of the mold 41. In this case, the mold 41 has a first countersink 60 in which the part 1 gets positioned. The mold 41 also has a second countersink 61 in which the part 2 gets positioned.

This variant has an advantage when the flexible coupling 6 adheres to the parts 1 and 2. Indeed, after stripping, the flexible coupling 6 maintains the relative position of the parts 1 and 2 and the swivel adjustment can be done according to one of the modes described here above.

The means used to position the part 1 with respect to the part 2 can also be applied, when shims are interposed between the parts 1 and 2, without the use of the shims as a mold.

What is claimed is:

1. A swivelling device comprising:

a pair of opposed mechanical parts having opposed interior surfaces facing each other;

a flexible coupling formed of a flexible material placed between the two mechanical parts and having opposed external surfaces contiguous with respective interior surfaces of the two mechanical parts; and an adjusting means to adjust the distance between the two mechanical parts,
    wherein the flexible coupling comprises bonder.

2. A device according to claim 1, wherein the adjusting means subject the flexible coupling to a tensile force.

3. A device according to claim 1, wherein the adjusting means subject the flexible coupling to a compressive force.

4. A device according to claim 1, wherein the center of rotation of the flexible coupling is located inside the flexible coupling.

5. A device according to claim 1, wherein the flexible coupling has a Young's modules ranging from 1 to 10 Mpa.

6. A device according to claim 1, wherein the adjusting means further comprises several screws.

7. A device according to claim 6, wherein the screws are four in number and their axes are substantially secant to a circle surrounding the center of the flexible coupling.

8. A device according to claim 7, wherein the intersections of the axes of the screws with the circle are located in a way that enables a swivel adjustment in two perpendicular directions.

9. A method for producing a swivelling device providing a pair of opposed mechanical parts, comprising the steps of:

drilling a hole into one of the mechanical parts; and injecting a flexible material through the hole to form a flexible coupling between the two mechanical parts.

10. A method according to claim 9, further comprising a step of interposing means between the two mechanical parts to maintain a distance between the two mechanical parts during the injection of the flexible material.

11. A method according to claim 10, further comprising the steps of:

maintaining a distance between the two mechanical parts;

forming a mold enabling full control over the shape and dimensions of the flexible coupling; and removing the mold after the shape of the flexible coupling has been stabilized.

12. A method according to either of the claims 10 or 11, further comprising a step of maintaining a distance between the two mechanical parts by positioning the two mechanical parts with respect to each other.

13. A method according to claim 9, further comprising a step of:

adjusting the distance between respective portions of the two mechanical parts to maintain said flexible coupling under one of a compressive force and a tensile force.

* * * * *